(12) United States Patent
Boie

(10) Patent No.: US 8,519,594 B2
(45) Date of Patent: Aug. 27, 2013

(54) HALL EFFECT POWER GENERATOR

(76) Inventor: David Mitchell Boie, Livingston, MT (US)

(*) Notice: Subject to any disclaimer, the term of this patent is extended or adjusted under 35 U.S.C. 154(b) by 319 days.

(21) Appl. No.: 13/163,394

(22) Filed: Jun. 17, 2011

(65) Prior Publication Data

US 2011/0241477 A1    Oct. 6, 2011

Related U.S. Application Data

(60) Provisional application No. 61/428,262, filed on Dec. 30, 2010.

(51) Int. Cl.
*H02N 11/00* (2006.01)

(52) U.S. Cl.
CPC .................................. *H02N 11/008* (2013.01)
USPC .................................. 310/300; 310/26; 310/28

(58) Field of Classification Search
CPC ....................................................... H02N 11/008
USPC ............................................ 310/26, 28, 300
See application file for complete search history.

(56) References Cited

U.S. PATENT DOCUMENTS

| | | | | |
|---|---|---|---|---|
| 2,814,015 | A * | 11/1957 | Friedrich | 323/368 |
| 3,305,790 | A * | 2/1967 | Parsons et al. | 330/6 |
| 3,319,173 | A * | 5/1967 | Engel | 330/6 |
| 3,355,605 | A * | 11/1967 | Okress | 310/11 |
| 5,146,125 | A * | 9/1992 | Kerlin | 310/68 R |
| 5,347,143 | A * | 9/1994 | Schroder | 505/191 |
| 5,646,527 | A * | 7/1997 | Mani et al. | 324/251 |
| 5,955,743 | A * | 9/1999 | Schroeder | 257/30 |
| 2011/0241477 | A1 * | 10/2011 | Boie | 310/300 |

* cited by examiner

*Primary Examiner* — John K Kim
(74) *Attorney, Agent, or Firm* — Sinorica, LLC

(57) ABSTRACT

One or more superconductive cells are connected in series to provide voltage arising from the Hall effect when cooled to superconductor temperatures and immersed in a magnetic field. The magnetic field causes the Hall-effect voltage to develop across the London penetration depth, normal to the surface of each superconductive cell. Conductors connect the back side of one cell with the front side of the adjacent cell. Each superconductive cell is at least the thickness of one London penetration depth.

20 Claims, 3 Drawing Sheets

HALL EFFECT POWER GENERATOR

This application is related to commonly-owned U.S. Provisional patent application Ser. No. 61/428,262, titled HALL-EFFECT POWER-GENERATOR, submitted 30 DEC 2010 by David Mitchell Boie, to which priority is claimed to the extent permitted by United States patent law, and which is incorporated herein in its entirety.

FIELD OF THE INVENTION

The present invention relates generally to an apparatus for converting magnetostatic power to conventional DC electricity. More particularly, the present invention allows access to the internal Hall effect voltage within the London Penetration depth of a magnetically immersed superconductor.

BACKGROUND OF THE INVENTION

The Hall effect power generator design idea discussed within this document is based upon long accepted understandings of the physics of superconductors, as well as understandings of the forces which account for the appearance of Hall effect voltages wherever electric currents and magnetic fields are directed normal to one another. Its operation suggests that certain gaps have existed in physical theory, namely that an electric charge or a permanent magnet actively radiates power into space which is unaccounted for by the conventional measure of electromagnetic power, denominated the Poynting Vector.

A growing number of physicists and engineers have directed their attention toward such gaps in physical theory, sometimes discussed under names such as Scalar Electromagnetics, Zero-point energy, and others. An important aspect, relied upon by the present invention, is the difference between viewing the field of an electric charge or magnetic dipole as static (the conventional view) compared with a view of these fields as standing waves which, despite their constancy with respect to position, nevertheless radiate power into the surrounding space.

To illustrate the notion of such fields being standing waves, consider the manufacture of a simple permanent magnet. Just prior to the completion of the manufacture of the permanent magnet, there is no magnetic field present, then an instant later a magnetic field does in fact exist and can be detected. Scalar electromagnetics would view this discontinuity of the magnetic field, with the dividing line between the pre-manifest and post-manifest condition not traversing the entire universe instantaneously (a violation of Einstein's restraint on speed of light), but rather radiating out into the space surrounding the newly-made magnet at a speed model according to both a transverse and longitudinal-wave inclusive form of Maxwell's equations.

With the energy of the magnetic field associated with the manufactured magnet being zero just prior to its making, and then progressively increasing as the new field expands, the evidence that the magnet must in fact be radiating power becomes apparent. The alternative would be to view the information and energy resulting from the magnet's manufacture as spontaneously appearing throughout all of time and space instantaneously—a clear violation of the speed of light limitation imposed by Maxwell's equations as well as Einstein's Relativity Theory.

SUMMARY OF THE INVENTION

The Hall effect power generator design disclosed herein capitalizes on the magnetostatic power that flows from a permanent magnet (or other source of static magnetic flux), converting this power into conventional DC electricity. The design does not claim to be an over-unity (or perpetual motion) device. In any case, the design collects only a fraction of the power being radiated by the permanent magnet and, since it contains conventional conductors with $I^2R$ losses, does so with an efficiency below unity. What is unique about the design is that it enables the tapping of hitherto ignored magnetostatic power for productive purposes. An image of such a pile power generator immersed in a magnetic field is illustrated in FIG. 1.

A Hall effect generator 200, is constructed of voltage-generating superconductive cells with the device powered by an applied magnetic field 102 provided by a source external to the invention itself.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAIL DESCRIPTIONS OF THE INVENTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The present invention is an apparatus for generating DC electricity using the magnetostatic power from a permanent magnet. The present invention, herein referred to as a Hall effect power generator, allows for accessing the internal Hall effect voltage which appears within the London Penetration depth of any magnetically immersed superconductor.

As is well understood by those skilled in the relevant art, a superconductor immersed in a static magnetic field has DC currents induced which confine themselves to the near-surface of the superconductor, up to a depth approximately equal to the London penetration depth. Within the London penetration region, both the magnetically-induced DC currents and the magnetic field co-exist within the same space, and are directed normal to one another. When a normal current and magnetic field exist within the same conducting space, the magnetic force on the current generates a Hall effect voltage, which the present invention utilizes as a power source.

In the generic situation of a superconductor immersed in a magnetic field, the magnetic force interacts with the current flowing within the London penetration region, building up charge concentrations thereby creating an electric field which exactly counterbalances the magnetic force, resulting in zero net force under steady-state conditions. This counterbalancing electric field is largely confined to the London penetration region, and is not easily externally detectable.

Figure 3:
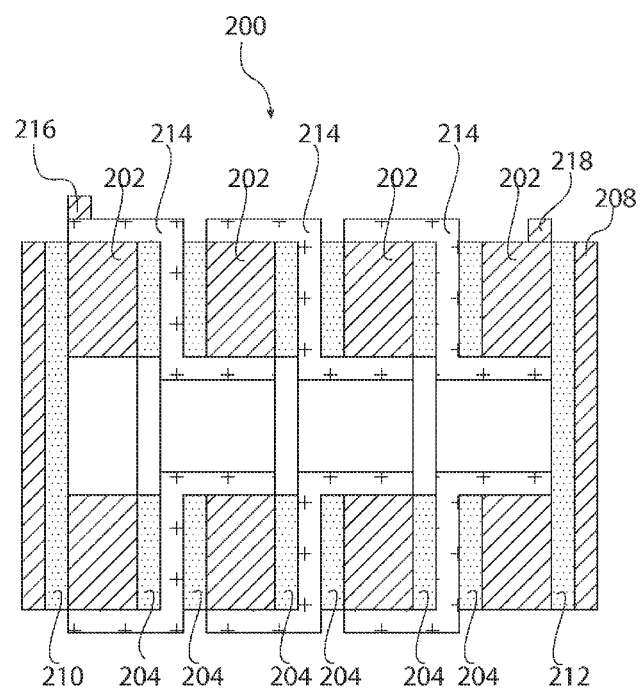
FIG. 3 is a cross-sectional view of the structure of FIG. 2.

The present invention may comprise one power generation cell. Other embodiments, as shown in FIG. 3, comprise a plurality of superconductive cells 202 electrically connected by conventional conductors 214 to connect the outer surface of one superconductive cell/ring 202 to the interior of an adjacent ring 202. Conductors 214 may be formed from gold, silver, platinum, or other non-ferrous materials providing a low ohmic resistance connection. Using a cell-type pile construction, the Hall effect power generator 200 electrically connects the topside of one London penetration region to the underside of the next, and, by altering the way charge concentrations are able to build up, effectively externalizes the Hall effect electric field from this region. As a result, the electric field corresponding to the Hall effect voltage which was confined to the London penetration region appears as a voltage potential between adjacent cells.

Figure 1:
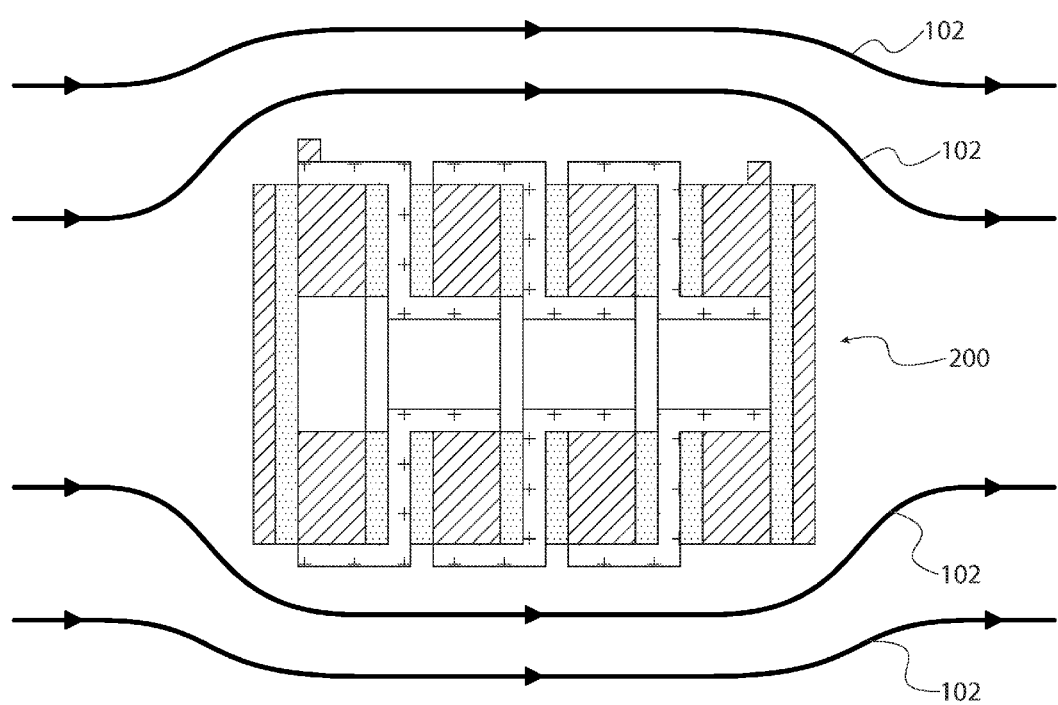
FIG. 1 is a drawing of the present invention in a magnetic field.
Figure 2:
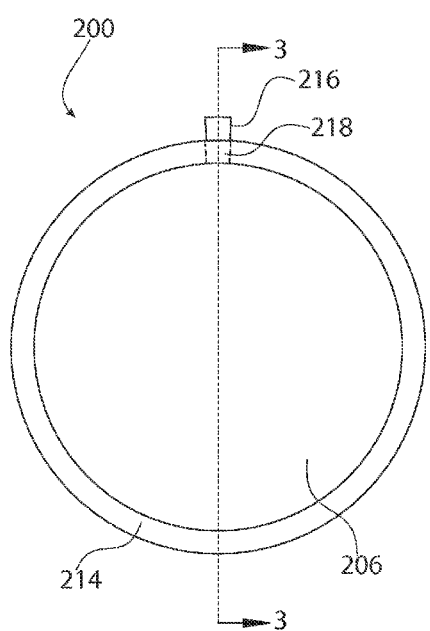
FIG. 2 is an end-view detailed drawing of the present invention and its structure.

Looking to FIG. 2, a Hall effect generator 200 includes a positive voltage terminal 216 and a negative voltage terminal 218. Looking further to FIG. 3, labeled cross section A-A of FIG. 2, a pile generator 200 is built from an arbitrary number of series-connected cells, each cell comprising a superconductive ring-shaped segment 202, at least one electrical insulator 204, and a conductor 214. In some embodiments an insulator 204 is on both sides of a conductor 214, as shown in FIG. 3. Note that the London penetration depth is measured radially, from the outside surface of a superconductive ring/cell 202 towards its center (that is, towards the cavity). The wall thickness of a superconductive cell 202, as measured from the outer surface to the interior cavity, is at least that of the London penetration depth. The summation of the voltage drops across the cells is available at the electrical output terminals 216, 218. The polarity is shown as a positive voltage at terminal 216, but may be reversed, depending upon the magnetic orientation of the applied magnetic field 102. In some embodiments the stack of cells is closed out on one or both ends, for example by a superconductor 206 and an electrical insulator 210 or a superconductor 208 and an electrical insulator 212. These disc-shaped superconductive end-caps 206, 208 serve to direct the applied magnetic field axially around the exterior of the pile generator, while also shielding the interior of the device from the applied magnetic flux. The insulating discs which accompany them 210, 212 serve to electrically separate the superconductive end-caps from the voltage generating cells arrayed between them.

The structural configuration enables accessing the internal Hall effect voltage which appears within the London penetration depth of any magnetically immersed superconductor, but which is normally inaccessible, in that the underside of the London penetration region is normally within the interior of the superconductor itself.

Figure 4:
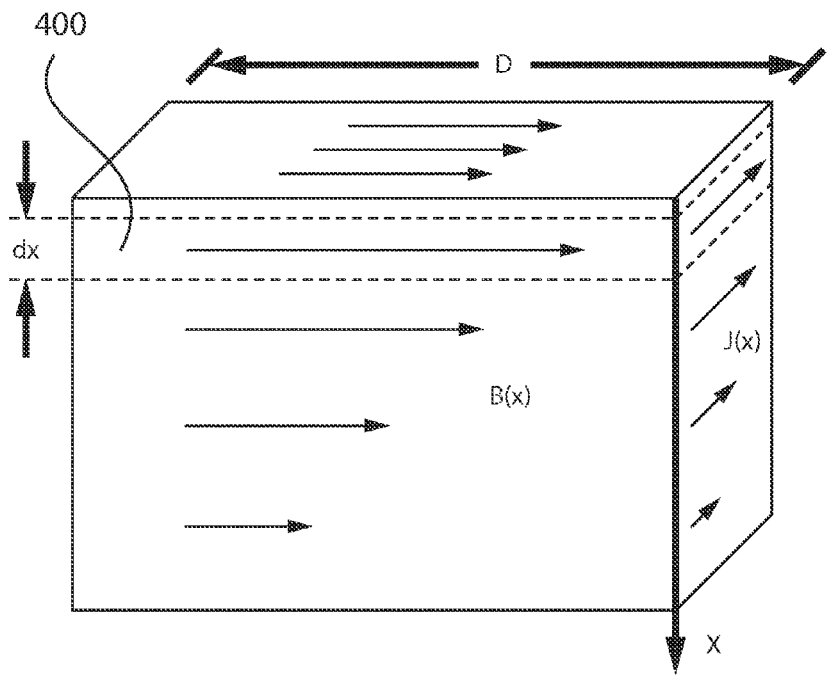
FIG. 4 is a graphic drawing of currents and fields in a London Penetration Region.
Figure 5:
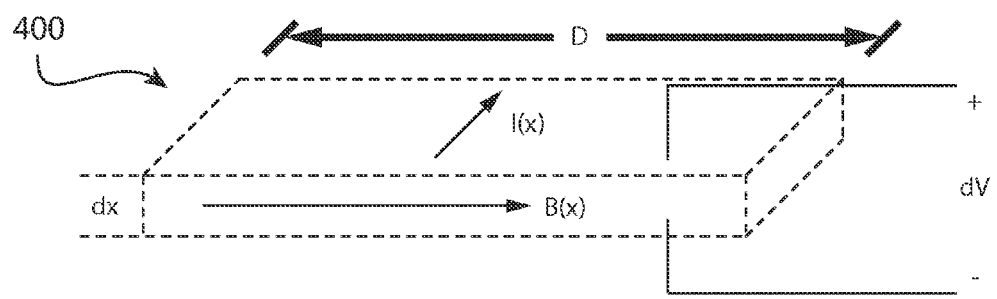
FIG. 5 is a drawing of an infinitesimally-thin slice of a conduction layer of the London Penetration region.

A formula (Equation 8 as shown below) expressing the magnitude of the Hall effect voltage made available for a single cell of structure Hall effect generator 200 can be derived from considerations of the physics which govern its operation. FIG. 4 shows a magnified view of the volume just under the surface of one of the superconductive cells. The magnetic field B(x) appears as an exponential decay function of the magnitude of the B field at the surface:

$$B(x) = B_s e^{\frac{-x}{\lambda}} \qquad \text{Equation 1}$$

The current density in this region is then defined as equal to the curl of the B field divided by the permeability of free space, per Equations 2 and 3:

$$J(x) = \frac{1}{\mu_0} \nabla \times B(x) \text{ and} \qquad \text{Equation 2}$$

$$J(x) = -\frac{1}{\mu_0} \frac{\partial}{\partial x} B_s e^{\frac{-x}{\lambda}} = \frac{1}{\lambda \mu_0} B_s e^{\frac{-x}{\lambda}} \qquad \text{Equation 3}$$

As seen from Equations 2 and 3, both the magnitude of the magnetic field B(x) and the current density J(x) in the superconductor fall off exponentially as depth (x) from the surface increases.

As illustrated in FIG. 4, the current I(x) in an infinitesimal slice 400 of the London penetration region (defined by height dx) is given by Equation 4:

$$I(x) = D [J(x)] dx. \qquad \text{Equation 4}$$

The current I(x) is used in conjunction with the standard equation for Hall effect voltage (Equation 5) to calculate the voltage (dV) for this infinitesimal slice of height dx (Equation 6):

$$dV = -\frac{B(x)I(x)}{Dne} = -\frac{B(x)J(x)dx}{ne}, \qquad \text{Equation 5}$$

and substituting from Equation 1 and Equation 3 we get:

$$dV = -\frac{1}{ne\lambda\mu_0} B_s^2 e^{\frac{-2x}{\lambda}} dx, \qquad \text{Equation 6}$$

where
  $\lambda$=London penetration depth,
  e=Coulombs of charge/electron {−1.602E(−19) Coulombs},
  n=charge carrier density of typical superconductor {for example 1E(+24) carriers/m}, and
  $\mu_0$=permeability of free space {1.2566E(−6) H/m}.

Performing an integration of dV from x:0→∞ then gives the corresponding total Hall effect voltage made available for a single cell of a Hall effect power generator 200 as a function of the magnetic field present at the surface of the superconductor (Bs) and the charge carrier density of the superconductive medium. So:

Equation 7, borrowing from Equation 6:

$$V = \int_0^\infty dV = \int_0^\infty -\frac{1}{ne\lambda\mu_0} B_s^2 e^{\frac{-2x}{\lambda}} dx =$$

$$-\frac{B_s^2}{ne\lambda\mu_0} \frac{-\lambda}{2} \int_0^\infty \frac{-2}{\lambda} e^{\frac{-2x}{\lambda}} dx = = \frac{B_s^2}{2ne\mu_0} \int_0^\infty \frac{-2}{\lambda} e^{\frac{-2x}{\lambda}} dx,$$

and, performing the integration:

$$V = \frac{B_s^2}{2ne\mu_0}(e^{-\infty} - e^0) = \frac{-B_s^2}{2ne\mu_0} \qquad \text{Equation 8}$$

While charge carrier densities (n) for type II superconductors vary, an example of how low they can be is found in SrTiO3, which can be doped to show superconductivity with charge carrier density as low as 1(E+24) carriers/m³. With this value of n, the voltage made available by a single power generator cell made with SrTiO3 and having a surface field magnitude (Bs) of 1 Tesla would be approximately 10 volts per cell. Output voltage would increase quadratically as input magnetic field magnitude (Bs) increases, yielding potentially very large output voltages even for a single cell. It is known that type-II superconductors have charge carrier densities numerous orders of magnitude lower than those typical of conventional metals. This fact increases the feasibility of using the Hall effect power generator 200 for power generation, in that an order of magnitude decrease in charge carrier density corresponds with an order of magnitude increase in available Hall effect voltage.

A multiple-celled Hall effect power generator 200 would generate substantial electrical power from the magnetic field of a permanent magnet without depleting the strength of the magnet itself through degaussing. This is largely because no variable reverse MMF appears in the design, which generates power under static magnetic conditions.

The preceding description of the disclosed embodiments is provided to enable any person skilled in the art to make or use the present invention. Various modifications to these embodiments will be readily apparent to those skilled in the art, and the generic principles defined herein may be applied to other embodiments and geometries without departing from the spirit or scope of the invention. Thus, the present invention is not intended to be limited to the embodiments shown herein but is to be accorded the widest scope consistent with the following claims and the principles and novel features disclosed herein.

What is claimed is:

1. A power generator that is powered by an applied magnetic field, comprising:
    a plurality of series-connected power generation cells;
    each of the plurality of series-connected power generation cells including an electrical insulator, a superconductive ring-shaped cell and a conductor;
    the conductor comprising a first part and a second part;
    the first part of the conductor being connected to an interior side of the superconductive ring-shaped cell; and
    the electrical insulator being inserted between the superconductive ring-shaped cell and the second part of the conductor.

2. The power generator that is powered by an applied magnetic field of claim 1, wherein the conductor connects the interior side of the superconductive ring-shaped cell to an outer surface of an adjacent superconductive ring-shaped cell.

3. The power generator that is powered by an applied magnetic field of claim 2, wherein an electrical insulator is inserted between the adjacent superconductive ring-shaped cell and the second part of the conductor.

4. The power generator that is powered by an applied magnetic field of claim 1, wherein a radial thickness of the superconductive ring-shaped cell is at least the London penetration depth of the superconductive ring-shaped cell.

5. The power generator that is powered by an applied magnetic field of claim 1, further comprising a first electrical output terminal and a second electrical output terminal; the first electrical output terminal being connected to the conductor in one of the plurality of series-connected power generation cells; and the second electrical output terminal being connected to an outer surface of the superconductive ring-shaped cell in one of the plurality of series-connected power generation cells.

6. The power generator that is powered by an applied magnetic field of claim 5, wherein a magnetic orientation of the applied magnetic field determines polarities of the first and the second electrical output terminals.

7. The power generator that is powered by an applied magnetic field of claim 1, wherein one or both ends of the power generator are sealed to avoid the applied magnetic field passing through an interior of the power generator.

8. The power generator that is powered by an applied magnetic field of claim 7, wherein the one or both ends of the power generator are sealed by an electrical insulator and a superconductor.

9. A power generator that is powered by an applied magnetic field, comprising:
    a plurality of series-connected power generation cells;
    each of the plurality of series-connected power generation cells including an electrical insulator, a superconductive ring-shaped cell and a conductor;
    a radial thickness of the superconductive ring-shaped cell being at least the London penetration depth of the superconductive ring-shaped cell;
    the conductor comprising a first part and a second part;
    the first part of the conductor being connected to an interior side of the superconductive ring-shaped cell;
    the electrical insulator being inserted between the superconductive ring-shaped cell and the second part of the conductor; and
    the conductor connecting the interior side of the superconductive ring-shaped cell to an outer surface of an adjacent superconductive ring-shaped cell.

10. The power generator that is powered by an applied magnetic field of claim 9, wherein an electrical insulator is inserted between the adjacent superconductive ring-shaped cell and the second part of the conductor.

11. The power generator that is powered by an applied magnetic field of claim 9, wherein one or both ends of the power generator are sealed to avoid the applied magnetic field passing through an interior of the power generator.

12. The power generator that is powered by an applied magnetic field of claim 11, wherein the one or both ends of the power generator are sealed by an electrical insulator and a superconductor.

13. The power generator that is powered by an applied magnetic field of claim 9, further comprising a first electrical output terminal and a second electrical output terminal; the first electrical output terminal being connected to the conductor in one of the plurality of series-connected power generation cells; and the second electrical output terminal being connected to an outer surface of the superconductive ring-shaped cell in one of the plurality of series-connected power generation cells.

14. The power generator that is powered by an applied magnetic field of claim 13, wherein a magnetic orientation of the applied magnetic field determines polarities of the first and the second electrical output terminals.

15. A power generator that is powered by an applied magnetic field, comprising:
    a plurality of series-connected power generation cells;
    each of the plurality of series-connected power generation cells including an electrical insulator, a superconductive ring-shaped cell and a conductor;
    the conductor comprising a first part and a second part;
    the first part of the conductor being connected to an interior side of the superconductive ring-shaped cell;
    the electrical insulator being inserted between the superconductive ring-shaped cell and the second part of the conductor;
    the conductor connecting the interior side of the superconductive ring-shaped cell to an outer surface of an adjacent superconductive ring-shaped cell; and one or both ends of the power generator being sealed to avoid the applied magnetic field passing through an interior of the power generator.

16. The power generator that is powered by an applied magnetic field of claim 15, wherein an electrical insulator is inserted between the adjacent superconductive ring-shaped cell and the second part of the conductor.

17. The power generator that is powered by an applied magnetic field of claim 15, wherein a radial thickness of the superconductive ring-shaped cell is at least the London penetration depth of the superconductive ring-shaped cell.

18. The power generator that is powered by an applied magnetic field of claim 15, wherein the one or both ends of the power generator are sealed by an electrical insulator and a superconductor.

19. The power generator that is powered by an applied magnetic field of claim 15, further comprising a first electrical output terminal and a second electrical output terminal; the first electrical output terminal being connected to the conductor in one of the plurality of series-connected power generation cells; and the second electrical output terminal being connected to an outer surface of the superconductive ring-shaped cell in one of the plurality of series-connected power generation cells.

20. The power generator that is powered by an applied magnetic field of claim 19, wherein a magnetic orientation of the applied field determines polarities of the first and the second electrical output terminals.

* * * * *